US010725750B2

(12) United States Patent
Conole

(10) Patent No.: US 10,725,750 B2
(45) Date of Patent: Jul. 28, 2020

(54) COMPILER INTEGRATED INTELLIGENT DESERIALIZATION FRAMEWORK

(71) Applicant: Red Hat, Inc., Raleigh, NC (US)

(72) Inventor: Aaron Conole, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 47 days.

(21) Appl. No.: 15/366,160

(22) Filed: Dec. 1, 2016

(65) Prior Publication Data

US 2018/0157469 A1    Jun. 7, 2018

(51) Int. Cl.
*G06F 8/41*    (2018.01)
*G06F 16/25*    (2019.01)

(52) U.S. Cl.
CPC ............. *G06F 8/41* (2013.01); *G06F 8/427* (2013.01); *G06F 8/447* (2013.01); *G06F 16/258* (2019.01)

(58) Field of Classification Search
None
See application file for complete search history.

(56) References Cited

U.S. PATENT DOCUMENTS

| | | | | |
|---|---|---|---|---|
| 6,466,583 | B1 * | 10/2002 | Laraqui | H04L 41/0213 370/465 |
| 7,149,287 | B1 * | 12/2006 | Burger | H04M 3/4938 379/88.17 |
| 7,647,415 | B1 | 1/2010 | Sandoz et al. | |
| 7,844,957 | B2 * | 11/2010 | Doucette | G06F 8/30 717/105 |
| 7,952,500 | B2 | 5/2011 | Ylonen | |
| 8,891,511 | B2 * | 11/2014 | Taylor | H04M 7/006 370/351 |
| 9,087,138 | B2 | 7/2015 | Zhou | |
| 2004/0107107 | A1 * | 6/2004 | Lenir | G06F 21/32 704/270.1 |

(Continued)

FOREIGN PATENT DOCUMENTS

KR    2002-0090512 A    12/2002
WO    2012/016443 A1    2/2012

OTHER PUBLICATIONS

Etingof, Ilya, PyASN1 programmer's manual, 2011, Link: http://www.red-bean.com/doc/python-pyasn1/pyasn1-tutorial.html (24 pages).

(Continued)

*Primary Examiner* — Matthew J Brophy
(74) *Attorney, Agent, or Firm* — K&L Gates LLP

(57) ABSTRACT

An example system includes a memory, a processor in communication with the memory, and a compiler that includes a serializer and a deserializer. The compiler executes on the processor to receive an input including a plurality of tags associated with a message. The compiler parses the input according to a specification and builds a tag trie from the plurality of tags, which includes a tag path and an end leaf. Each tag path includes a first tag and one or more candidate tags, which includes a last candidate tag. The last candidate tag in each tag path is the respective end leaf. The compiler walks the tag trie to obtain each tag path and generates a type of source code, which converts the input into an equivalent representation of a data structure associated with the message. The compiler also provides the type of source code to a user application.

19 Claims, 5 Drawing Sheets

(56) References Cited

U.S. PATENT DOCUMENTS

| | | | | |
|---|---|---|---|---|
| 2004/0215797 | A1* | 10/2004 | Hadley | H04L 29/06 709/230 |
| 2005/0091058 | A1* | 4/2005 | Biettron | H04M 3/4938 704/270.1 |
| 2006/0224959 | A1* | 10/2006 | McGuire | G06F 40/18 715/700 |
| 2007/0044069 | A1* | 2/2007 | Doucette | G06F 8/30 717/106 |
| 2007/0050705 | A1* | 3/2007 | Liu | G06F 8/37 715/215 |
| 2007/0050706 | A1* | 3/2007 | Liu | G06F 8/37 715/215 |
| 2007/0050707 | A1* | 3/2007 | Liu | G06F 8/37 715/234 |
| 2007/0050760 | A1* | 3/2007 | Liu | G06F 8/37 717/143 |
| 2014/0334614 | A1* | 11/2014 | Mezhibovsky | H04M 3/42382 379/88.01 |
| 2015/0019576 | A1* | 1/2015 | Seneski | G06F 40/221 707/755 |
| 2017/0339002 | A1* | 11/2017 | Sigoure | H04L 67/2823 |

OTHER PUBLICATIONS

Walkin, Lev, Using the Open Source ASN.1 Compiler. Mar. 28, 2013 (33 pages).

Lelik, Elemer, Eclipse Community Forums, Jan. 2015, Link: https://www.eclipse.org/forums/index.php/t/1070344/ (6 pages).

* cited by examiner

COMPILER INTEGRATED INTELLIGENT DESERIALIZATION FRAMEWORK

BACKGROUND

Specifications or standards generally describe rules and structures for representing, encoding, transmitting, and decoding data. For example, the Abstract Syntax Notation One (ASN.1) is a communications exchange specification, which is extensively used in security, telephony, and configuration management. Compilers may be used in conjunction with the specifications to generate data objects per the rules described in the specification. Data structures or objects may be translated into different formats that can be stored or transmitted. When the resulting series of bits is reread according to a serialization format, it can be used to create an identical clone of the original object. The opposite operation, extracting a data structure from a series of bites, is deserialization.

SUMMARY

The present disclosure provides a new and innovative systems and methods for a compiler integrated intelligent deserialization framework. In an example embodiment, a system includes a memory, at least one processor in communication with the memory, and a compiler. The compiler includes a serializer and a deserializer. Additionally, the compiler executes on the at least one processor to receive an input associated with a message. The input includes a plurality of tags. Responsive to receiving the input, the compiler executes on the at least one processor to parse the input according to a specification, and responsive to parsing the input, build a tag trie from the plurality of tags. The tag trie includes at least one tag path and at least one end leaf. Each of the at least one tag paths includes a first tag and one or more candidate tags, which include a last candidate tag. The last candidate tag in each of the at least one tag paths is the respective end leaf. Responsive to building the tag trie, the compiler executes on the at least one processor to walk the tag trie to obtain each of the at least one tag paths associated with each of the at least one end leafs, and generate at least one type of source code based on each of the at least one the tag paths associated with each of the at least one end leafs. The at least one type of source code converts the input into an equivalent representation of a data structure associated with the message. The compiler also provides the at least one type of source code to a user application.

An example method includes receiving, by a compiler, a first input associated with a message. The first input includes a first plurality of tags. The compiler parses the first input according to a first specification, and builds a tag trie from the plurality of tags. The tag trie includes at least one tag path and at least one end leaf. Each of the at least one tag paths includes a first tag and one or more candidate tags, which include a last candidate tag. The last candidate tag in each of the at least one tag paths is a respective end leaf. The compiler also walks the tag trie to obtain each of the at least one tag paths associated with each of the at least one end leafs and generates a first type of source code based on each of the at least one tag paths associated with each of the at least one end leafs. The first type of source code converts the input into an equivalent representation of a data structure associated with the message. Then, the compiler provides the first type of source code to a user application. Additionally, the tag trie may be emitted by the compiler for runtime processing.

An example non-transitory machine readable medium stores a program, which, when executed by a processor, causes a compiler to receive a first input associated with a first message, where the first input includes a first plurality of tags. Then, the non-transitory machine readable medium causes the compiler to parse the first input according to a first specification and build a tag trie from the plurality of tags. The tag trie includes at least one tag path and at least one end leaf. Each of the at least one tag paths includes a first tag and one or more candidate tags, which include a last candidate tag. The last candidate tag in each of the at least one tag paths is a respective end leaf. The non-transitory machine readable medium causes the compiler to walk the tag trie to obtain each of the at least one tag paths associated with each of the at least one end leafs and generate a first type of source code based on each of the at least one tag paths associated with each of the at least one end leafs. The first type of source code converts the input into an equivalent representation of a data structure associated with the message. Then, the non-transitory machine readable medium causes the compiler to provide the first type of source code to a user application.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing a compiler integrated intelligent deserialization framework. Typically, compilers are used to generate data objects according to a specific specification or standard. However, users may be responsible for calling the appropriate deserialization routines in order to extract the proper information from the data objects. For example, the ASN.1 compiler may be used to generate data objects according to the ASN.1 specification.

However, ASN.1 compilers often only generate simple objects than an end user must select between. For example, if a user generates an ASN.1 definition that includes multiple messages (e.g., a hello message and a goodbye message), the user is responsible for correctly calling the appropriate deserialization routine associated with the desired message (e.g., respective hello and goodbye deserialization routines). In order to ensure that the proper routine is called, compilers may often generate redundant boilerplate code to ensure that each piece (e.g., hello message, goodbye message, etc.) of the entire message may be decoded, which adds additional overhead to using ASN.1 messages. For example, typical deserialization routines will attempt to deserialize a first message (e.g., hello message) and test whether the deserialization fails. If a failure occurs, the routine will try to deserialize the second message (e.g., goodbye message) and subsequent messages until one succeeds. Depending on how the ASN.1 object is specified, this could result in thousands of additional lines of boilerplate code written into the deserialization routine. For example, an entire message may have hundreds or thousands of separate pieces or individual messages.

As described in the various example embodiments disclosed herein, to eliminate the burden of writing this redundant and boilerplate code in the deserialization routines, the compiler may parse an input, build a tag trie from the input, and walk the tag trie to obtain a tag path associated with each message. For example, by building and walking the tag trie, the tag path associated with each respective message may be identified allowing each respective message to be deserialized with the proper routine. Conversely, without identifying the tag path(s) associated with each message, redundant boilerplate code may need to be generated to ensure the proper deserialization routine is called, which increased overhead. However, by using the presently disclosed systems and methods, this increased overhead may be advantageously reduced.

Figure 1:
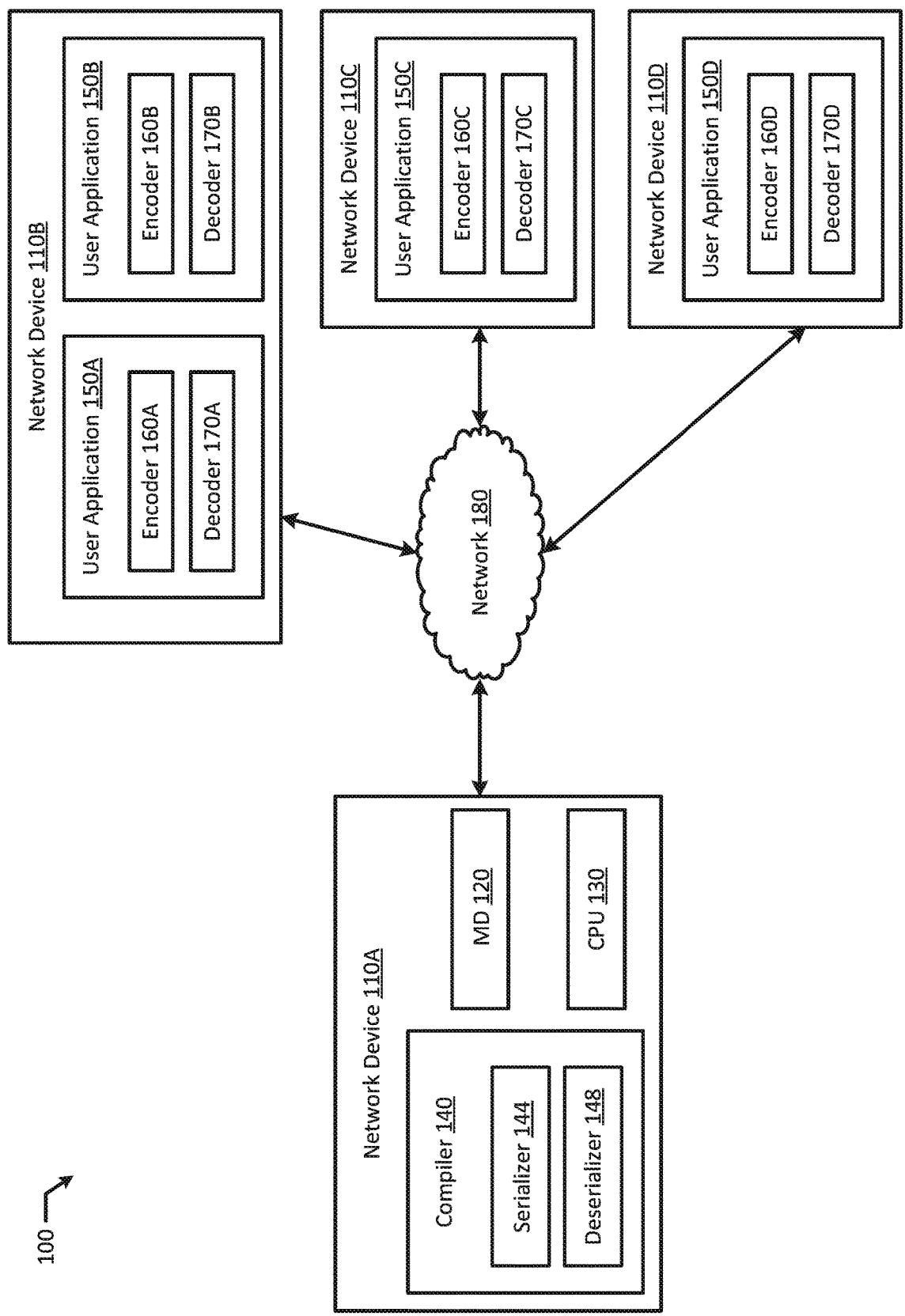
FIG. 1 illustrates a block diagram of an example compiler integrated system according to an example embodiment of the present disclosure.

FIG. 1 depicts a high-level component diagram of an example compiler integrated system 100 in accordance with one or more aspects of the present disclosure. The compiler integrated system 100 may include one or more network devices 110A-D. The network devices may be computers, telephones, printers, routers, etc. Each network device (e.g., network device 110A) may in turn include one or more physical processors (e.g., CPU 130) communicatively coupled to memory devices (e.g., MD 120). Additionally, each network device (e.g., network device 110A) may include a compiler 140. The compiler 140 may include a serializer 144 and a deserializer 148. Each network device (e.g., network device 110B-D) may include one or more user applications (e.g., user application 150A-D, hereinafter user application 150). User application 150 may include an encoder (e.g., encoder 160A-D, hereinafter encoder 160) and a decoder (e.g., decoder 170A-D, hereinafter decoder 170). In an example embodiment, a network device (e.g., network device 110A-D) may be implemented as a virtual machine.

A computer or CPU may run a virtual machine by executing a software layer above a hardware and below the virtual machine. A virtual machine may be presented a virtualized physical layer, including processors, memory, and I/O devices. For example, a virtual machine may include virtual processors, virtual memory devices, and/or virtual I/O devices. A virtual machine may execute a guest operating system, which may utilize the virtual processors, virtual memory devices, and/or virtual I/O devices. Additionally, a virtual machine may include one ore more applications that run on the virtual machine under the guest operating system.

As used herein, a physical processor or processor (e.g., CPU 130) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device (e.g., MD 120) refers to a volatile or non-volatile memory device, such as RAM, ROM, EEPROM, or any other device capable of storing data.

In an example embodiment, the network devices 110A-D (e.g., printers, personal computers, servers, routers, etc.) may communicate via a network 180. For example, the network 180 may be a public network (e.g., the Internet), a private network (e.g., a local area network (LAN) or wide area network (WAN)), or a combination thereof. In an example embodiment, network device 110A may communicate with network device 110C via network device 110B (e.g., network device 110B may be a router) wirelessly via the Internet, or network device 110A may communicate with network device 110B via an ethernet connection while network device 110A communicates to network device 110C wirelessly via the Internet. For example, a user of network device 110A may be sending information to and receiving information from network device 110B via the network 180. In an example embodiment, the network devices (110A-D) may all communicate wirelessly via the Internet. In an example embodiment, the network devices (110A-D) may all communicate via a wired connection.

Figure 2:
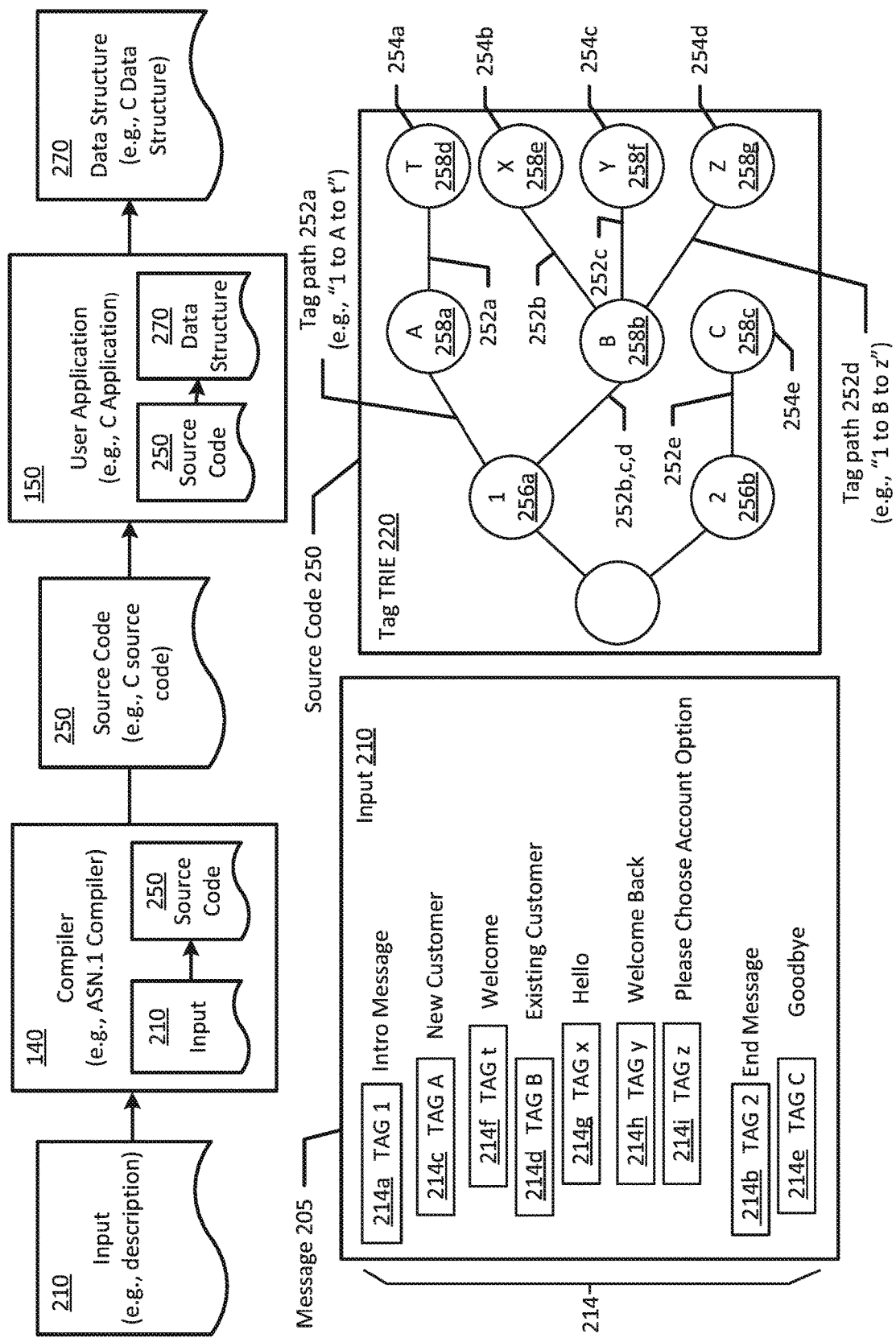
FIG. 2 illustrates a block diagram of an example input and source code used with an example compiler integrated system according to an example embodiment of the present disclosure.

FIG. 2 illustrates an example input 210 and source code 250 used with, for example, the compiler integrated system 100. In an example embodiment, input 210 may be associated with message 205. For example, the input 210 may be a description of the message 205. The input 210 may include a plurality of tags 214. In the illustrated example, the message 205 may be for an automated telephone database and the input 210 may include messages associated with tags 214 for the automated telephone database. The input 210 may includes tags (e.g., tag "1" 214a) for intro messages and tags (e.g., tag "2" 214b) for end messages. The intro messages may be further be broken into messages specific to a "New Customer" (e.g., tag "A" 214c) or for an "Existing Customer" (e.g., tag "B" 214d). New customers may be greeted with a welcome message denoted by tag 214f (e.g., tag "t"), while existing customers may be greeted with messages such as "hello", "welcome back", or "please choose an account option" (e.g., tags 214g-i), for example, depending on the stage of the phone call. The end message may be the same for both new and existing customers. For example, the specific end message may be "goodbye" (e.g., tag "C" 214e). In an example, the end messages may be different for each type of customer. Additionally, the automated telephone database example is for illustration purposes only. The above described system could be used for many other applications that require compiling and deserializing.

The input 210 may be sent to a compiler 140, which may convert the input 210 to source code 250 (e.g., JAVA source code, C++ source code, etc.). For example, the compiler 140 may parse the input 210 and build a tag trie 220 from the plurality of tags 214 included in the input 210. The compiler 140 may generate a specific type of source code 250 such that the information in the input 210 is compatible with different systems. For example, if an automatic telephone database requires JAVA data structures 270, the compiler 140 may generate JAVA source code 250 that can be used to convert the input 210 into the appropriate JAVA data structures 270.

The tag trie 220 may include the plurality of tags 214 from the input 210. In an example, the tag trie 220 may include at least one tag path (e.g., tag path 252a-e, hereinafter tag path 252) and at least one end leaf (e.g., end leaf 254a-e, hereinafter end leaf 254). Each tag path 252 includes a first tag (e.g., first tag 256a-b, hereinafter first tag 256) and one or more candidate tags (e.g., candidate tags 258a-f, hereinafter candidate tags 258), which include a last candidate tag (e.g., tags 258c-g). The last candidate tag (e.g., tags 258c-g) in each of the tag paths 252 is the respective end leaf 254. For example, candidate tag 258d is the end leaf 254a for the tag path 252a that extends from the first tag 256a (e.g., tag 1) to the candidate tag 258a (e.g., tag A) and to end leaf 254a (e.g., candidate tag 258d for tag T). For example, tag path 252a defines an intro message (e.g., tag 1) for a new customer (e.g., tag A) that greets the customer with a "welcome" message (e.g., tag T). The automated "welcome" message is associated with the end leaf 254a of the tag path 252a.

Similarly, candidate tag 258g is the end leaf 254d for tag path 252d that extends from first tag 256a (e.g., tag 1) to candidate tag 258b (e.g., tag B) and to end leaf 254d (e.g., candidate tag 258g for tag Z). For example, tag path 252d defines an intro message (e.g., tag 1) for an existing customer (e.g., tag B) that prompts the customer to "please choose an account option" (e.g., tag Z). Each of the other tag paths (e.g., 252b, 252c, and 252e) are associated with end leafs (e.g., 254b, 254c, and 254e) respectively. For example, tag path 252e defines an end message for customers that provides a "goodbye" message (e.g., tag C). Additionally, tag path 252b may generate an automated "hello" message for an existing customer when they call into the telephone database. Tag path 252c may generate an automated "welcome back" message for an existing customer (e.g., customer may have been on hold and may receive a welcome back message when they are returned from hold). Additionally, tag path 252e may generate an automated "goodbye" message for customers (e.g., new customers and existing customers) at the end of the call.

After the compiler 140 builds the tag trie 220, the compiler 140 may generate at least one type of source code 250 based on each of the tag paths 252 associated with each of the end leafs 254. Since each end leaf 254 is unique, the compiler 140 may generate a type of source code 250 that identifies each tag path 252 and each end leaf 254 (e.g., automated message) from the input 210 such that the multiple types of messages (e.g., new customer, existing customer, etc.) are distinguishable, which advantageously allows the message to be deserialized without the need of the redundant lines of code to distinguish the message. In an example, the tag trie 220 may be emitted by the compiler 140 for runtime processing.

In an example, the at least one type of source code 250 may include a library call for the serializer 144 in the compiler 140. In another example, the source code 250 may include a library call for the deserializer 148 in the compiler 140. Additionally, the source code 250 may include a library call for both the serializer 144 and deserializer 148. In another example, the serializer 144 and/or the deserializer 148 may be a generated form. For example, a user may create the serializer 144 and/or the deserializer 148 for complex data types. In an example, the source code 250 converts the input 210 into an equivalent representation of a data structure 270 associated with the message 205. For example, a user application 150 (e.g., C application) may use the source code 250 (e.g., C source code) to convert the input 210 into a data structure 270, such as a C data structure.

In an example, the application 150 may include an encoder 160 to convert the data structure (e.g., C data structure) to an octet string. For example, the encoder 160 may be an encode routine run on a program of the user application 150. Additionally, the user application 150 may include a decoder 170 to convert an octet string into the data structure 270. Similarly, the decoder 170 may be a decode routine run on a program of the user application 150.

Figure 3:
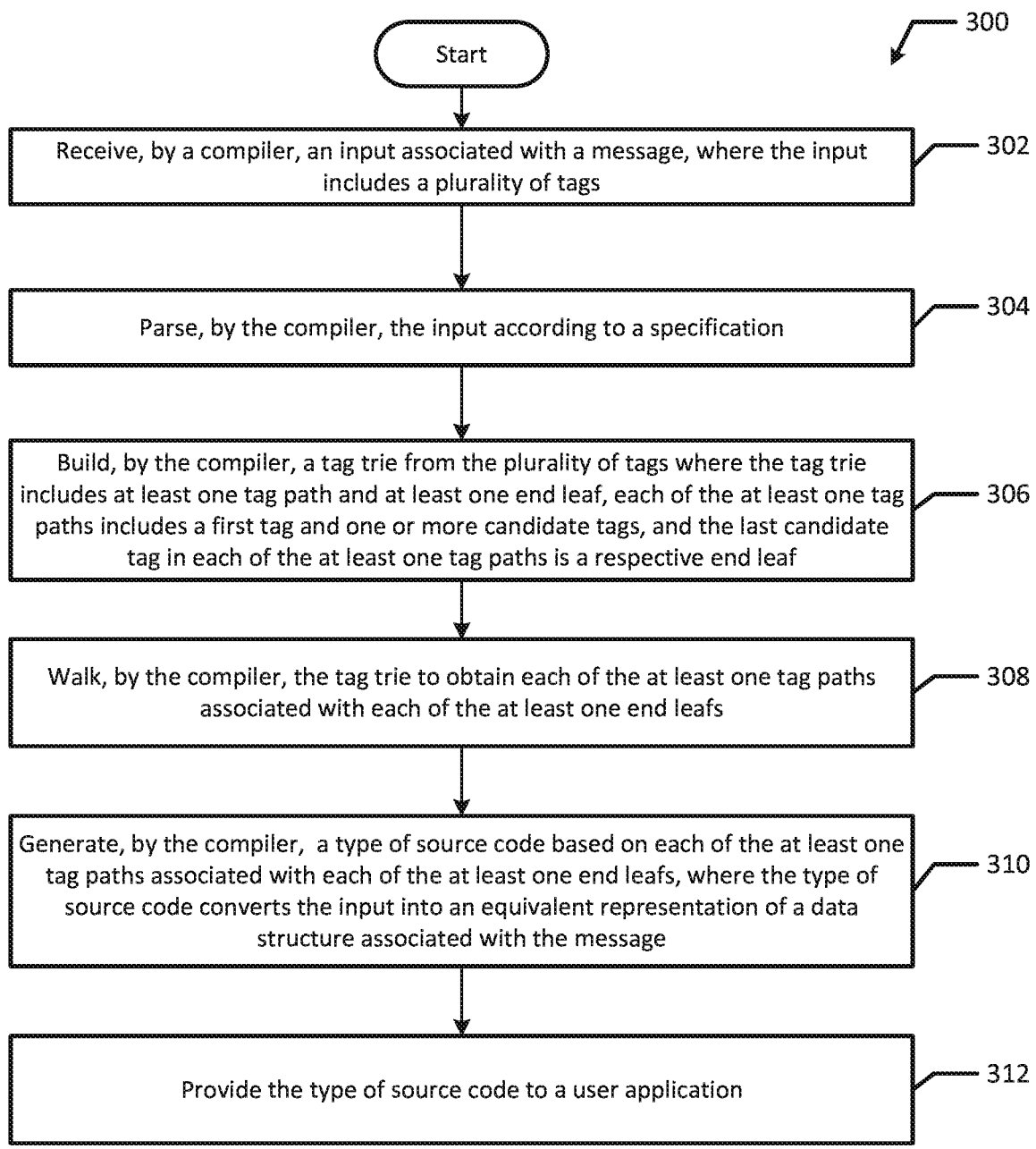
FIG. 3 illustrates a flowchart of an example process for compiler integrated deserialization according to an example embodiment of the present disclosure.

FIG. 3 illustrates a flow diagram of an example method 300 for compiler integrated deserialization in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

In the illustrated example method 300, a compiler receives an input associated with a message, where the input includes a plurality of tags (block 302). For example, compiler 140 may receive an input 210 associated with a message 205. In an example, the input 210 may include a plurality of tags 214 (e.g., tags 214a-i). Additionally, the input 140 may be a description of the message 205. For example, the input may be a compiled list of automated responses for a telephone database. Then, the compiler parses the input according to a specification (block 304). For example, compiler 140 may parse the input 210 according to a specification, such as the ASN.1 specification.

The compiler builds a tag trie from the plurality of tags where the tag trie includes at least one tag path and at least one end leaf, each of the at least one tag paths includes a first tag and one ore more candidate tags, which include a last candidate tag, and the last candidate tag in each of the at least one tag paths is a respective end leaf (block 306). For example, compiler 140 may build a tag trie 220 from the plurality of tags 214. In an example, the tag trie 220 may include at least one tag path 252 and at least one end leaf 254. Additionally, each of the tag paths 252 may include a first tag 256 and one or more candidate tags 258. The last candidate tag 258 in each of the tag paths 252 is a respective end leaf 254. Each tag path 252 identifies a specific end leaf 254 such that each message from the input is distinguishable, which advantageously enables each message to be deserialized without checking for deserialization failure thereby avoiding additional overhead. For example, previous techniques included trying to deserialize each message from the input 210 one by one using the same deserialization routine until a message is properly deserialized, which may require excessive amounts of additional and redundant code. Then, the compiler walks the tag trie to obtain each of the at least one tag paths associated with each of the at least one end leafs (block 308). For example, compiler 140 may walk the tag trie 220 to obtain each of the at least one tag paths 252 associated with each of the at least one end leafs 254. In an example, the compiler 140 may perform a walk function on the tag trie 220. Referring back to FIG. 2, there are five end leafs (e.g., end leaf 254a-e) and thus there are five tag paths (e.g., tag path 252a-e) such that each end leaf 254 is associated with a tag path 252. In an example, the tag trie 220 may be emitted by the compiler 140 for runtime processing.

The compiler generates a type of source code based on each of the at least one tag paths associated with of the at least one end leafs, where the type of source code converts the input into an equivalent representation of a data structure associated with the message (block 310). For example, the compiler 140 may generate a type of source code 250, such as JAVA, C++, etc. source code based on each of the tag paths 252. As discussed above, each tag path 252 is associated with a respective end leaf 254. In an example, JAVA source code 250 converts the input 210 into an equivalent representation of a JAVA data structure 270 that is associated with the message 205, which advantageously allows contents of the message 205 to be adapted to systems having different platforms and code compatibility. For example, the compiler 210 may be used to generate multiple types of source code 250 from the same input 210.

Then, the source code is provided to a user application (block 312). In an example, the type of source code 250 may include a library call for a serializer 144. In another example, the type of source code 250 may include a library call for a deserializer 148 associated with the compiler 140. Additionally, the source code 250 may include a library call for the serializer 144 and deserializer 148. In another example, the serializer 144 and/or the deserializer 148 may be a generated form. For example, a user may create the serializer 144 and/or the deserializer 148 for complex data types. For example, the type of source code 250 may be provided to a user application 150 such that the application 150 may convert the input 210 into a data structure 270.

Figure 4:
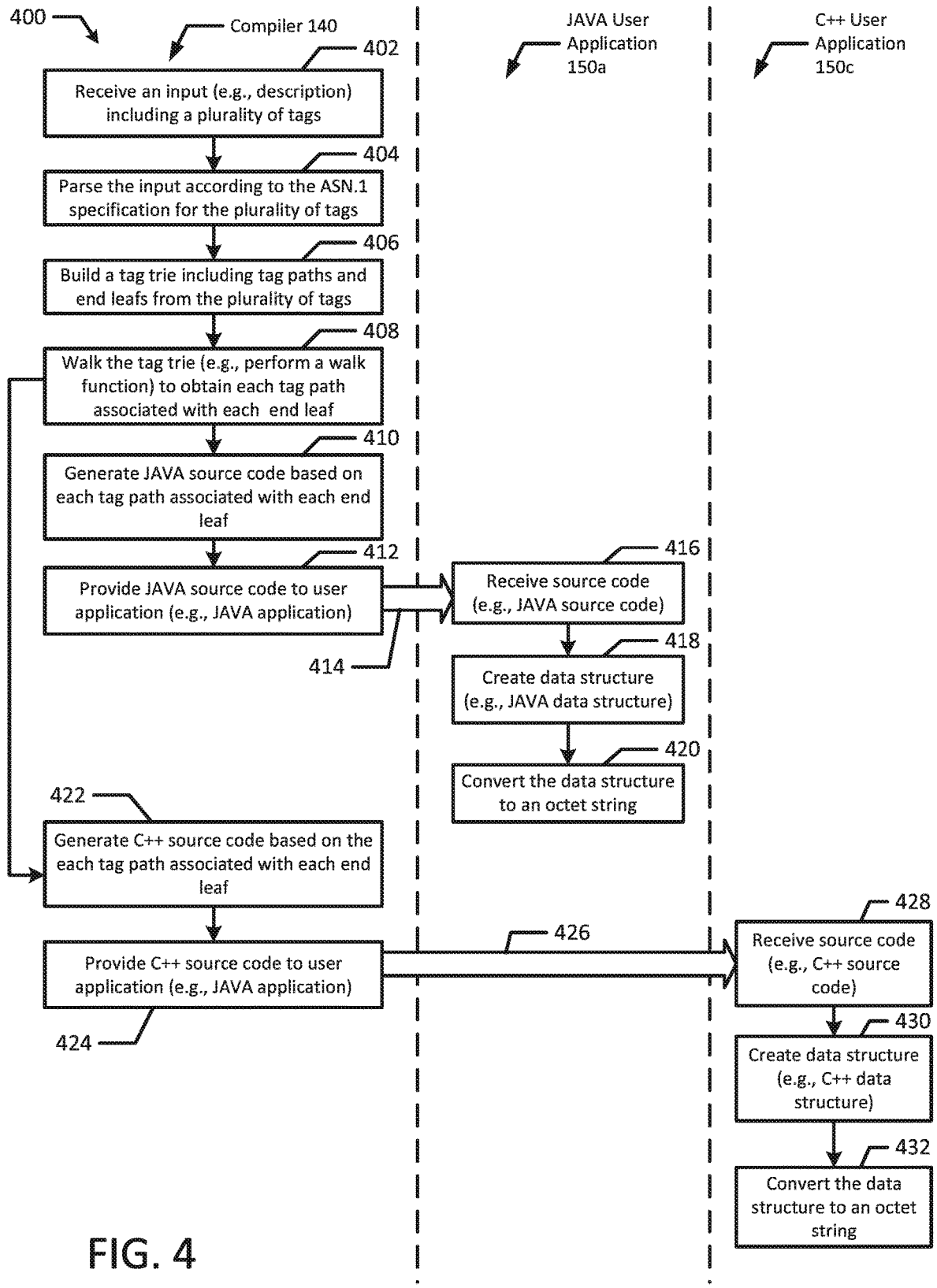
FIG. 4 illustrates a flow diagram of an example process for compiler integrated deserialization according to an example embodiment of the present disclosure.

FIG. 4 depicts a flow diagram illustrating an example method 400 of compiler integrated deserialization according to an example embodiment of the present disclosure. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuitry, dedicated logic, etc.), software, or a combination of both.

In the illustrated example embodiment, a compiler 140 may receive and input 210 (e.g., a description) including a plurality of tags 212 (block 402). The input 210 may be associated with a message 205. For example, the input 210 may be a description of the message 205. The compiler 140 may parse the input 210 according to the ASN.1 specification for the plurality of tags 214 (blocks 404). In an example embodiment, the compiler 140 may parse the input 210 according to any other specification. Then, the compiler 140 may build a tag trie 220 including tag paths 252 and end leafs 254 from the plurality of tags 214 (block 406). In an example, each tag path 252 may include a first tag 256 and one or more candidate tags 258 where the last candidate tag 258 in each tag path 252 is the respective end leaf 254. The compiler 140 may walk the tag trie 220 to obtain each tag path 252 associated with each end leaf 254 (block 408). For example, the compiler 140 may perform a walk function on the tag trie 220 built from the input 210. In an example, the tag trie 220 may be emitted by the compiler 140 for runtime processing.

Then, the compiler 140 may generate JAVA source code 250 based on each tag path 252 associated with each end leaf 254 (block 410). In an example, the compiler 140 may also generate other types of source code 250 (e.g., C, C++, Python, etc.). Then, the compiler 140 may provide the source code 250 (e.g., JAVA source code) to a user application 150A (e.g., JAVA application) (blocks 412 and 414). In an example embodiment, the compiler 140 may provide the source code 250 to a network device (e.g., network device 110B-D). The network device (e.g., network device 110B-D) may receive the source code 250 and a user application (e.g., user application 150A-D) may generate an equivalent representation of the data structure 270 associated with the message 205 from the source code 250. Then, the JAVA user application 150A may receive the source code 250 (e.g., JAVA source code) (block 416). In an example embodiment, the user application 150A may receive the source code 250 from a network device (e.g., network device 110A, 110B). For example, network device 110A may send the source code 250 to application 150A. Additionally, network device 110A may send the source code 250 to network device 110B, which later may send the source code 250 to user application 150A. The JAVA user application 150A may create a data structure 270 (e.g., JAVA data structure) (block 418). For example, the JAVA data structure 270 may be an equivalent representation of the input 210, but in a JAVA format to be used with other JAVA applications and/or devices. In an example, the data structure 270 may be a scalar data type or a constructed data type. Then, the JAVA user application 150A may convert the data structure to an octet string (block 420). In an example, the octet string may be used by the user application 150A to provide a "hello" message. For example, the JAVA user application 150A may include an encoder 160A to convert the data structure into an octet string. In an example, the octet string may be used by the user application 150A to provide a "hello" message from an automated telephone database to a customer. Additionally, a customer input (e.g., a voice command or a key entry) may be encoded and/or decoded into a respective octet string or data structure for the automated telephone database. For example, the JAVA user application 150A may include a decoder 170A to decode an octet string into a data structure.

Similarly, the compiler 140 may generate C++ source code 250 based on each tag path 252 associated with each end leaf 254 (block 422). Then, the compiler 140 may provide the source code 250 (e.g., C++ source code) to a user application 150C (e.g., C++ application) (blocks 424 and 426). Then, the C++ user application 150C may create a data structure 270 (e.g., C++ data structure) (block 430). For example, the C++ data structure 270 may be an equivalent representation of the input 210, but in a C++ format to be used with other C++ applications and/or devices. In an example embodiment, the compiler 140 may generate several different types of source code 250 from the input 210 such that the input 210. For example, the compiler 140 may convert the input 210 into various different types of source code 250 that are used to convert the input 210 into the appropriate data structure 270. Then, the C++ user application 150C may convert the data structure 270 to an octet string (block 432). In an example, the octet string may be used by the user application 150C to provide a "hello" message. For example, the C++ user application 150C may include an encoder 160C to convert the data structure into an octet string. In an example, the octet string may be used by the user application 150C to provide a "hello" message from an automated telephone database to a customer. Additionally, a customer input (e.g., a voice command or a key entry) may be encoded and/or decoded into a respective octet string or data structure for the automated telephone database. For example, the C++ user application 150C may include a decoder 170C to decode an octet string into a data structure.

Figure 5:
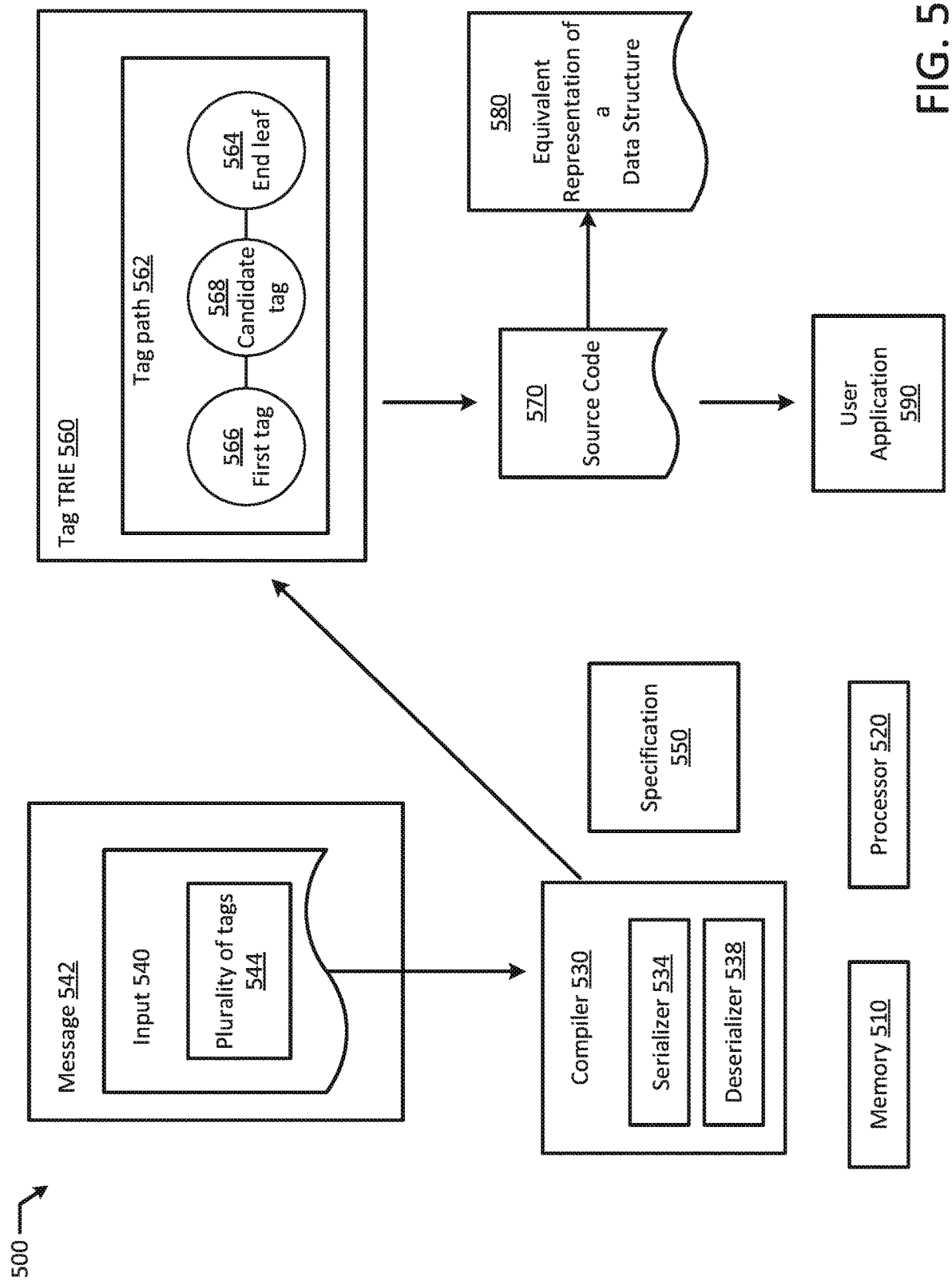
FIG. 5 illustrates a block diagram of an example compiler integrated system according to an example embodiment of the present disclosure.

FIG. 5 is a block diagram of an example compiler integrated system 500 in accordance with one or more aspects of the present disclosure. The compiler integrated system 500 may include a memory 510 and at least one processor (e.g., processor 520) in communication with the memory 510. The compiler integrated system 500 may also include a compiler 530 including a serializer 534 and a deserializer 538. The compiler 530 may execute on the at least one processor (e.g., processor 520) to receive an input 540 associated with a message 542. The input 540 may include a plurality of tags 544. Responsive to receiving the input 540, the compiler 530 may execute on the at least one processor (e.g., processor 520) to parse the input 540 according to a specification 550, and responsive to parsing the input 540, the compiler 530 may build a tag trie 560 from the plurality of tags 544. The tag trie 560 may include at least one tag path 562 and at least one end leaf 564. Each of the at least one tag paths 562 may include a first tag 566 and one or more candidate tags 568, which include a last candidate tag 568. The last candidate tag 568 in each of the at least one tag paths 562 is the respective end leaf 564. Responsive to building the tag trie 560, the compiler 530 may execute on the at least one processor to walk the tag trie 560 to obtain each of the at least one tag paths 562 associated with each of the at least one end leafs 564, and may generate at least one type of source code 570 based on each of the at least one the tag paths 562 associated with each of the at least one end leafs 564. The at least one type of source code 570 may convert the input 540 into an equivalent representation of a data structure 580 associated with the message 542. The compiler 530 may also provide the at least one type of source code 570 to a user application 590.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
at least one processor in communication with the memory; and
a compiler including a serializer and a deserializer, wherein the compiler executes on the at least one processor to:
receive an input associated with a message, wherein the input includes a plurality of tags,
responsive to receiving the input, parse the input according to a specification,
responsive to parsing the input, build a tag trie from the plurality of tags, wherein
the tag trie includes a plurality of tag paths, wherein each of the plurality of tag paths is associated with a respective end leaf,
each of the plurality of tag paths includes a respective first tag and one or more respective candidate tags, which includes a respective last candidate tag,
the last candidate tag in each of the plurality of tag paths is the respective end leaf,
each of the plurality of tag paths corresponds to a respective automated voice message,
a first tag path of the plurality of tag paths includes a respective first tag that specifies that the message is an intro message, a respective candidate tag that specifies that the intro message is for a new customer, and a respective end leaf that specifies a respective welcome automated voice message for the new customer,
a second tag path of the plurality of tag paths includes a respective first tag that specifies that the message is an intro message, a respective candidate tag that specifies that the intro message is for an existing customer, and a respective end leaf that specifies a respective welcome back automated voice message for the existing customer, and
a third tag path of the plurality of tag paths includes a respective first tag that specifies that the message is an end message and a respective end leaf that specifies a respective goodbye automated voice message for the end message,
responsive to building the tag trie, walk the tag trie to obtain each of the plurality of tag paths associated with each of the respective end leafs,
generate at least one type of source code based on each of the plurality of tag paths associated with each respective end leafs, wherein the at least one type of source code converts the input into an equivalent representation of a data structure associated with the message, and
provide the at least one type of source code to a user application, wherein the at least one type of source code is adapted to employ at least one of the serializer and the deserializer to convert the source code into the respective automated voice message for each of the plurality of tag paths.

2. The system of claim 1, wherein the at least one type of source code includes a library call for at least one of the serializer and the deserializer, and the at least one type of source code includes both C++ source code and JAVA source code.

3. The system of claim 1, wherein the serializer and the deserializer are a generated form.

4. The system of claim 1, wherein the user application executes on the at least one processor to generate the equivalent representation of the data structure associated with the message from the at least one type of source code.

5. The system of claim 1, wherein the user application includes an encoder to convert the data structure to an octet string.

6. The system of claim 5, wherein the encoder is an encode routine run on a first program of the user application.

7. The system of claim 1, wherein the user application includes a decoder to convert an octet string into the data structure.

8. The system of claim 7, wherein the decoder is a decode routine run on a second program of the user application.

9. The system of claim 1, wherein the input is a description of the message.

10. The system of claim 1, wherein the specification is an ASN.1 specification.

11. A method comprising:
receiving, by a compiler, a first input associated with a message, wherein the first input includes a first plurality of tags;
parsing, by the compiler, the first input according to a first specification;
building, by the compiler, a tag trie from the plurality of tags, wherein
the tag trie includes a plurality of tag paths, wherein each of the plurality of tag paths is associated with a respective end leaf,
each of the plurality of tag paths includes a respective first tag and one or more respective candidate tags, which includes a respective last candidate tag,
the last candidate tag in each of the plurality of tag paths is the respective end leaf,
each of the plurality of tag paths corresponds to a respective automated voice message,
a first tag path of the plurality of tag paths includes a respective first tag that specifies that the message is an intro message, a respective candidate tag that specifies that the intro message is for a new customer, and a respective end leaf that specifies a respective welcome automated voice message for the new customer,
a second tag path of the plurality of tag paths includes a respective first tag that specifies that the message is an intro message, a respective candidate tag that specifies that the intro message is for an existing customer, and a respective end leaf that specifies a respective welcome back automated voice message for the existing customer, and
a third tag path of the plurality of tag paths includes a respective first tag that specifies that the message is an end message and a respective end leaf that specifies a respective goodbye automated voice message for the end message;
walking, by the compiler, the tag trie to obtain each of the plurality of tag paths associated with each of the respective end leafs;
generating, by the compiler, a first type of source code based on each of the plurality of tag paths associated with each of the respective end leafs, wherein the first type of source code converts the input into an equivalent representation of a data structure associated with the message; and
providing the first type of source code to a user application, wherein the first type of source code is converted into the respective automated voice message for each of the plurality of tag paths.

12. The method of claim 11, further comprising generating, by the compiler, a second type of source code from the first input, wherein the second type of source code includes a second tag trie.

13. The method of claim 11, further comprising:
receiving, by the compiler, a second input associated with the message, wherein the second input includes a second plurality of tags;
parsing, by the compiler, the second input according to the first specification;
building, by the compiler, a second tag trie from the second plurality of tags, wherein
the second tag trie includes at least one second tag path and at least one second end leaf,
each of the at least one second tag paths includes a second tag and one or more second candidate tags, and
the last second candidate tag in each of the at least one second tag paths is a second respective end leaf; and
generating, by the compiler, a second type of source code from the second input based on each of the at least one second tag paths associated with each of the at least one second end leafs, wherein the second type of source code converts the second input into a second equivalent representation of a second data structure associated with the message.

14. The method of claim 11, further comprising:
receiving, by a networking device, the first type of source code; and
generating, by the user application, an equivalent representation of the data structure associated with the message from the first type of source code.

15. The method of claim 14, wherein the data structure includes at least one of a scalar data type and a constructed data type, and wherein the first input is a description of the message.

16. The method of claim 11, wherein the first type of source code includes one of C code, C++ code, and Java code.

17. A non-transitory machine readable medium storing a program, which when executed by a processor, causes a compiler to:
receive a first input associated with a first message, wherein the first input includes a first plurality of tags;
parse the first input according to a first specification;
build a tag trie from the plurality of tags, wherein
the tag trie includes a plurality of tag paths, wherein each of the plurality of tag paths is associated with a respective end leaf,
each of the plurality of tag paths includes a respective first tag and one or more respective candidate tags, which includes a respective last candidate tag,
the last candidate tag in each of the plurality of tag paths is a respective end leaf, and
each of the plurality of tag paths corresponds to a respective automated voice message
a first tag path of the plurality of tag paths includes a respective first tag that specifies that the message is an intro message, a respective candidate tag that specifies that the intro message is for a new customer, and a respective end leaf that specifies a respective welcome automated voice message for the new customer, a second tag path of the plurality of tag paths includes a respective first tag that specifies that the message is an intro message, a respective candidate tag that specifies that the intro message is for an existing customer, and a respective end leaf that specifies a respective welcome back automated voice message for the existing customer, and a third tag path of the plurality of tag paths includes a respective first tag that specifies that the message is an end message and a respective end leaf that specifies a respective goodbye automated voice message for the end message;

walk the tag trie to obtain each of the plurality of tag paths associated with each of the respective end leafs;

generate a first type of source code based on each of the plurality of tag paths associated with each of the respective end leafs, wherein the first type of source code converts the input into an equivalent representation of a data structure associated with the message; and provide the first type of source code to a user application, wherein the first type of source code is converted into the respective automated voice message for each of the plurality of tag paths.

18. The non-transitory machine readable medium of claim 17, which further causes the compiler to:

generate a second type of source code from the first input, wherein the second type of source code includes a second tag trie.

19. The non-transitory machine readable medium of claim 17, which further causes the compiler to:

receive a second input associated with a second message, wherein the second input includes a second plurality of tags;

parse the second input according to the first specification;

build a second tag trie from the second plurality of tags, wherein the second tag trie includes at least one second tag path and at least one second end leaf, each of the at least one second tag paths includes a second tag and one or more second candidate tags, and the last second candidate tag in each of the at least one second tag paths is a second respective end leaf; and generate a second type of source code from the second input based on each of the at least one second tag paths associated with each of the at least one second end leafs, wherein the second type of source code converts the second input into a second equivalent representation of a second data structure associated with the second message.

* * * * *